US011963282B2

(12) United States Patent
Tal et al.

(10) Patent No.: US 11,963,282 B2
(45) Date of Patent: Apr. 16, 2024

(54) AD-HOC LIGHTING NETWORK AND METHOD OF DEPLOYMENT

(71) Applicant: AEKI INTELLECTUAL HOLDINGS, LLC, Fort Lauderdale, FL (US)

(72) Inventors: Sean E. Tal, Plantation, FL (US); Austin M. Tal, Plantation, FL (US); Charles Fedonczak, Melbourne, FL (US)

( * ) Notice: Subject to any disclaimer, the term of this patent is extended or adjusted under 35 U.S.C. 154(b) by 0 days.

(21) Appl. No.: 17/857,008

(22) Filed: Jul. 3, 2022

(65) Prior Publication Data

US 2024/0008158 A1 Jan. 4, 2024

(51) Int. Cl.
*H05B 47/19* (2020.01)

(52) U.S. Cl.
CPC .................................... *H05B 47/19* (2020.01)

(58) Field of Classification Search
CPC ....................................................... H05B 47/19
See application file for complete search history.

(56) References Cited

U.S. PATENT DOCUMENTS 7,433,324 B2 * 10/2008 Switzer ................... G06F 9/451 370/347
8,364,085 B2 * 1/2013 Barnum ................ H04W 8/005 370/386
8,570,190 B2 * 10/2013 Marinakis ............. H05B 47/22 362/183
8,660,121 B2 * 2/2014 McCormack ......... H04W 48/14 370/254
2002/0075870 A1 * 6/2002 de Azevedo ............ H04L 67/51 370/432
2009/0066540 A1 * 3/2009 Marinakis .............. H05B 47/22 340/909
2011/0007663 A1 * 1/2011 Scotton ............... H04W 40/246 370/254
2011/0095709 A1 * 4/2011 Diehl ...................... F21V 23/04 315/363
2013/0136033 A1 * 5/2013 Patil ...................... H04W 84/18 370/254

(Continued)

FOREIGN PATENT DOCUMENTS

CN 104918338 A * 9/2015
CN 105099839 A * 11/2015

(Continued)

*Primary Examiner* — Raymond R Chai
(74) *Attorney, Agent, or Firm* — Alexander Postnikov

(57) ABSTRACT

An ad-hoc lighting network comprised of a plurality of light units, each of the light units including a light source, a manual input component, memory, a transmitter, a receiver, and a processing unit. A method of deploying the lighting network may include steps of providing a plurality of light units, placing each of the light units within a communication range, causing each of the light units to enter PAIRING MODE, causing each of the light units to add, into its network list, other unique identifiers of other light units; and causing each of the light units to enter PAIRED MODE. Light units function identically with respect to received reserved commands. Any light unit can broadcast commands, causing all light units in the network, or a subset thereof, to execute the command. Such commands may cause the desired lighting configuration.

8 Claims, 8 Drawing Sheets

(56) References Cited

U.S. PATENT DOCUMENTS

| | | | | |
|---|---|---|---|---|
| 2013/0264943 | A1* | 10/2013 | Bora | H05B 47/11 315/153 |
| 2013/0300945 | A1* | 11/2013 | Seo | H04N 21/41265 348/734 |
| 2014/0070959 | A1* | 3/2014 | Bhargava | G05B 15/02 340/870.07 |
| 2014/0125451 | A1* | 5/2014 | Sako | H05B 47/115 340/4.2 |
| 2014/0293276 | A1* | 10/2014 | Hughes | H05B 47/11 356/222 |
| 2014/0300293 | A1* | 10/2014 | Ruan | F21S 2/00 315/294 |
| 2017/0295628 | A1* | 10/2017 | De Bevilacqua | H04B 10/116 |
| 2018/0124903 | A1* | 5/2018 | Strods | H04Q 9/00 |
| 2018/0288847 | A1* | 10/2018 | Halliwell | H05B 45/10 |
| 2019/0319705 | A1* | 10/2019 | Harris | H04W 40/248 |
| 2020/0120781 | A1* | 4/2020 | Abraham | H05B 47/19 |
| 2021/0067936 | A1* | 3/2021 | Lu | H04W 76/14 |
| 2021/0297483 | A1* | 9/2021 | Ottaviano | H05B 47/19 |
| 2021/0297927 | A1* | 9/2021 | Westrick, Jr. | H04B 17/391 |
| 2022/0095198 | A1* | 3/2022 | Zhang | H04W 40/20 |

FOREIGN PATENT DOCUMENTS

| | | | | | |
|---|---|---|---|---|---|
| CN | 108769972 | A | * | 11/2018 | |
| CN | 116052405 | A | * | 5/2023 | |
| EP | 2381678 | B1 | * | 4/2016 | H04N 21/42207 |
| GB | 2414100 | A | * | 11/2005 | G08C 19/28 |
| GB | 2416964 | A | * | 2/2006 | B60R 25/24 |

* cited by examiner

AD-HOC LIGHTING NETWORK AND METHOD OF DEPLOYMENT

BACKGROUND

Field of the Invention

The present invention relates generally to lighting networks, and, in particular, to lighting networks comprised of a plurality of light units.

Scope of the Prior Art

Light units in a traditional lighting network often require an internet connection to facilitate inter-unit communication, limiting network placement. Furthermore, many lighting networks only function for a fixed set of light units. For example, a set of ten light units are configured, during the manufacturing process, to ignore commands from light units outside of that set. The resulting lighting network prevents the introduction of additional light units, removing the option for network scalability. Lastly, many lighting networks are susceptible to accidental interference. For example, light units in your network should not execute commands broadcast from one of the neighbor's light units.

What is needed is a lighting network comprised of a plurality of light units that is easy-to-deploy, scalable, flexible, and immune to outside interference after deployment.

SUMMARY

The present disclosure satisfies the foregoing needs by providing, inter alia, an ad-hoc lighting network for addressing each of the foregoing desirable traits as well a method of its deployment.

One aspect of the present invention is directed at a light unit to be used in an ad-hoc lighting network, the light unit comprised of: a light source; a manual input component; memory including: a unique identifier, reserved commands, and a network list of other light units; a transmitter; a receiver; and a processing unit. In certain embodiments, the transmitter is configured to broadcast a transmission including at least one of: the unique identifier of the light unit and a command, and one of the reserved commands. In certain embodiments, the processing unit is configured to execute received commands based on factors including, but not limited to, the nature of the command, how the command was received, and the light unit's operating mode. In certain embodiments, reserved commands include START PAIRING, ADD TO NETWORK, END PAIRING, and RESET commands. In certain embodiments, manual inputs are received when a user toggles a light unit's manual input component a number of times within a time frame.

Another aspect of the present invention is directed at an ad-hoc lighting network comprised of a plurality of the light units. Within this network, each of the light units is configured to function identically with respect to the reserved commands received via the manual input component of the light unit, to function identically with respect to the reserved commands received not via manual input component (e.g., received by the receiver) of the light unit, and to act as a controller for all light units in the lighting network. This functional uniformity among the light units embodies a significant advance over existing lighting networks. In contrast to existing lighting networks that require a user to interact with a designated master controller, the lighting network of the present invention can be controlled using any one of the light units. There is no need for a master controller as a user can simply interact with the nearest light unit.

Another aspect of the present invention is directed at a method of deploying an ad-hoc lighting network, the method comprised of: providing a providing a plurality of light units, each of the light units including a light source, a manual input component, memory including: a unique identifier, reserved commands, and a network list of paired light units, a transmitter, a receiver, and a processing unit; placing each of the light units in a communication range; causing each of the light units to enter PAIRING MODE; causing each of the light units to add, into its network list, the unique identifier of other light units; and causing each of the light units to enter PAIRED MODE. In certain embodiments, the processing unit is configured to execute received commands based on factors including, but not limited to, the nature of the command, how the command was received, and the light unit's operating mode. In certain embodiments, the transmitter is configured to broadcast a transmission including at least one of: the unique identifier of the light unit and a command, and one of the reserved commands. In certain embodiments, each of the light units enters PAIRING MODE when a user toggles, a first number of times, the manual input component of a first light unit, causing that light unit to enter PAIRING MODE and to broadcast a transmission containing a START PAIRING that, when executed by other light units, causes the other light units to enter PAIRING MODE; each of the light units adds, into its network list, the unique identifier of the other light units when the user toggles, a second number of times, the manual input component of each of the light units, causing each of the light units to broadcast a transmission containing an ADD TO NETWORK command that, when executed by the other light units, causes each of the other light units to add, into its network list, the unique identifier of the broadcasting light unit; and each of the light units enters PAIRED MODE when the user toggles, a third number of times, the manual input component of a second light unit, causing that light unit to enter PAIRED MODE and to broadcast a transmission containing an END PAIRING command that, when executed by the other light units, causes the other light units to enter PAIRED MODE.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations. Wherever convenient, the same reference numbers will be used throughout the drawings to refer to same or like parts.

Moreover, while variations described herein are primarily discussed in the context of light units configured to form an ad-hoc network, it will be recognized by those of ordinary skill that the present disclosure is not so limited. In fact, the principles of the present disclosure described herein may be readily applied to ad-hoc network formation in general.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Figure 1:
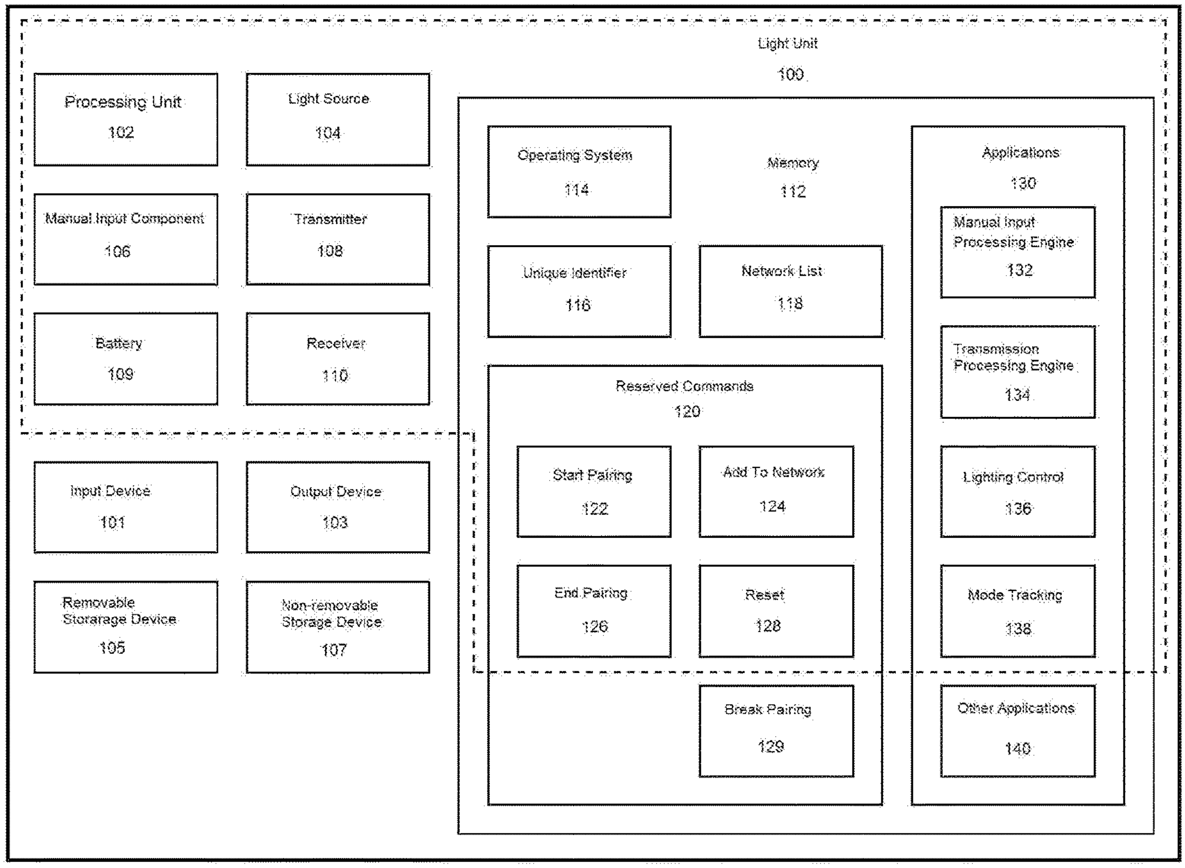
FIG. 1 is a block diagram illustrating example physical components of a light unit with which aspects of the present disclosure may be practiced.

FIG. 1 is a block diagram illustrating example physical components (e.g. hardware) of a light unit 100. The basic configuration is illustrated by those components within the dashed line. In this basic configuration, the light unit 100 may include at least one processing unit 102 and memory 112.

The processing unit 102 executes commands to perform the functions specified in flowcharts and/or block diagram blocks throughout this disclosure. It should be appreciated that processing may be implemented either locally via the processing unit 102 or remotely via various forms of wireless or wired networking technologies or a combination of both.

The term computer readable media as used herein may include computer storage media. Computer storage media may include volatile and nonvolatile, removable and non-removable media implemented in any method or technology for storage of information, such as computer readable instructions, data structures, or program modules. The memory 112, the removable storage device 105, and the non-removable storage device 107 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the light unit 100. In some embodiments, such computer storage media may be part of the light unit 100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Memory 112 may include various types of short and long-term memory as is known in the art. Memory 112 may be loaded with various applications 130 in the form of as computer readable program instructions. These computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Applications 130 may include a manual input processing engine 132, a transmission processing engine 134, a lighting control module 136, and a mode tracking module 138 as will be further discussed. Accordingly, memory 112 includes all necessary applications per each embodiment.

The manual input processing engine 132 is configured to interpret and execute commands received through the manual input component 106 or an input device 101. According to an embodiment, the manual processing engine 132 interprets the number of toggles of a manual input component 106 within a given time frame to determine the desired command. Whether or not the desired command is executed depends on factors including, but not limited to, the operating mode, the command, and the like, as will be later discussed.

The transmission processing engine 134 is configured to interpret and execute commands received through transmissions broadcast from another light unit. According to an embodiment, the transmission processing engine 134 interprets the transmission to determine the desired command. Whether or not the desired command is executed depends on factors including, but not limited to, the operating mode, the command, the source of the transmission, and the like, as will be later discussed.

The lighting control module 136 controls illumination of the light source 104. According to an embodiment, the lighting control module 136 may cause the light source to illuminate in any color, pattern, intensity, and the like. In certain embodiments, pattern effects are achieved through the control of several light units within a network. It should be appreciated that changes in color, strobing, and other effects, can be achieved instantaneously.

The mode tracking module 138 tracks the operating mode of the light unit 100. Operating modes may affect functionality of the light unit 100. For example, in certain embodiments, the execution of a command may be based on the operating mode. Operating modes may include a NORMAL MODE, a PAIRING MODE, and a PAIRED MODE, as will be later discussed. Alternatively, operating modes include at least a pairing mode and a non-pairing mode.

Memory 112 may also include an operating system 114, a unique identifier 116, a network list 118, and reserved commands 120 as will be further discussed. In some embodiments, reserved commands 120 may include START PAIRING 122, ADD TO NETWORK 124, END PAIRING 126, and RESET 128 commands as will be further discussed. In certain embodiments, memory 112 may be implemented locally, whereas in other embodiments, memory 112 may be implemented remotely.

The operating system 114 is suitable for controlling the operation of the light unit 100.

The unique identifier 116 provides each light unit 100 with a unique identity. According to an embodiment, the unique identifier 116 may be an electronic serial number (ESN) assigned to each light unit 100 during the manufacturing process.

The network list 118 is a list of other light units recognized by the light unit 100. According to an embodiment, the network list 118 may contain the unique identifiers of other light units. Alternatively, the network list 118 may contain any non-unique identifiers or assigned names of other light units.

The reserved commands 120 are a set of commands used in the formation of an ad-hoc lighting network. According to an embodiment, reserved commands 120 are programmed into each light unit 100 during the manufacturing process. It should be appreciated light units 100 may be updated to add new reserved commands 120 to memory 112.

The light unit 100 may further comprise a light source 104, a manual input component 106, a transmitter 108, a receiver 110, and a battery 109.

In an embodiment, the light source 104 is a plurality of LEDs producing illumination in the visible spectrum. Alternatively, the light source 104 may produce illumination in the infrared and ultraviolet spectrums.

The manual input component 106 is used to manually interact with the light unit 100. According to an embodiment, the manual input component 106 is any physical part which can be toggled between at least two distinct states, including, but not limited to, a button that can be pressed or a switch that can be flipped.

As previously stated, a user can input a desired command into the light unit 100 by toggling the manual input component 106 a number of times within a time frame. According to an embodiment, the desired command may be one of the reserved commands. For example, one toggle may cause the light unit 100 to enter PAIRING MODE and to transmit a START PAIRING command, two toggles may cause the light unit 100 to transmit an ADD TO NETWORK command, and three toggles may cause the light unit 100 to enter PAIRED MODE and to transmit an END PAIRING command. It should be appreciated that in certain embodiments there is one manual input component for each of the reserved commands.

The transmitter 108 is configured to broadcast transmissions containing communicative signals and/or data to other light units within a communication range. According to an embodiment, the transmitter 108 may be any transmitter operating according to conventional wired communication media, including, but not limited to, ethernet or fiberoptic cables. Alternatively, the transmitter 108 may be any transmitter operating according to conventional wireless communication media including, but not limited to, a Bluetooth transmitter. It should be appreciated that wireless communication media enables a light unit to communicate with other light units without a physical connection between the light unit and its environment. For example, a light unit may employ power line modem technology for communication with other light units by transmitting communicative signals through nearby wiring. Yet alternatively, the transmitter 108 may enable communication using transmissions in any frequency of the electromagnetic spectrum including radio, ultrasonic, infrared, and microwave frequencies, or other energy transmission mechanisms, including ultrasonic, auditory, and laser transmissions. That is, the transmitter 108 should be understood to encompass any device or method for communicating, wired or wirelessly, communicative signals and/or data to other light units. Accordingly, the light unit 100 may be programmed to control transmissions in an ordinary manner.

According to an embodiment, transmissions may contain at least one of:

- the unique identifier of the light unit and a command; and
- one of the reserved commands.

Alternatively, transmissions may also contain the unique identifier of other light units in the network list of the broadcasting light unit. Thus, a transmission can target a specific other light unit, or a subset of other light units, in the network list.

The receiver 110 is configured to receive communicative signals and/or data from other light units within a communicating range. According to an embodiment, the receiver 110 may be any receiver operating according to conventional wired communication media including, but not limited to, ethernet or fiberoptic cables. Alternatively, the receiver 110 may be any receiver operating according to conventional wireless communication media including, but not limited to, a Bluetooth receiver. It should be appreciated that wireless communication media enables a light unit to communicate with other line units without a physical connection between the light unit and its environment. For example, a light unit may employ power line modem technology for communication with other light units by receiving communicative signals through nearby wiring. Yet alternatively, the receiver 110 may enable communication by receiving transmissions in any frequency of the electromagnetic spectrum including radio, ultrasonic, infrared, and microwave frequencies, or other energy transmission mechanisms, including ultrasonic, auditory, and laser transmissions. That is, the receiver 110 should be understood to encompass any device or method for receiving, wired or wirelessly, communicative signals and/or data from other light units. Accordingly, the light unit 100 may be programmed to control the receival of transmissions in an ordinary manner.

The battery 109 provides power to the components of the light unit 100. According to an embodiment, the battery 109 may be a lithium-ion battery or any other conventional power storage device.

In certain embodiments, the light unit 100 may further comprise an input device 101 and an output device 103.

The input device is used to interact with the light unit 100. According to an embodiment, the input device 101 may be a touchscreen or keypad. Alternatively, the input device 101 may be a microphone for speech capture, a camera for visual text or motion capture, a keyboard, or any other device or method of receiving user commands.

The output device 103 is used to interact with a user. According to an embodiment, the output device 103 may be a display screen in any of the various forms associated with smart devices. Alternatively, the output device 103 may be a speaker, acoustic generator, or any other device or method of transmitting updates or data. Accordingly, the processing unit 102 may be configured to cause the output device 103 to indicate entry of the light unit into the selected operational mode through the use of flashing lights or the like.

In certain embodiments, applications 130 may include other applications 140. According to an embodiment, other applications 140 may change how commands are interpreted, as well as what function they perform when executed. Other applications 140 may be end-user applications that enable the light unit 100 to run interactive, intelligent games for entertainment.

Figure 2:
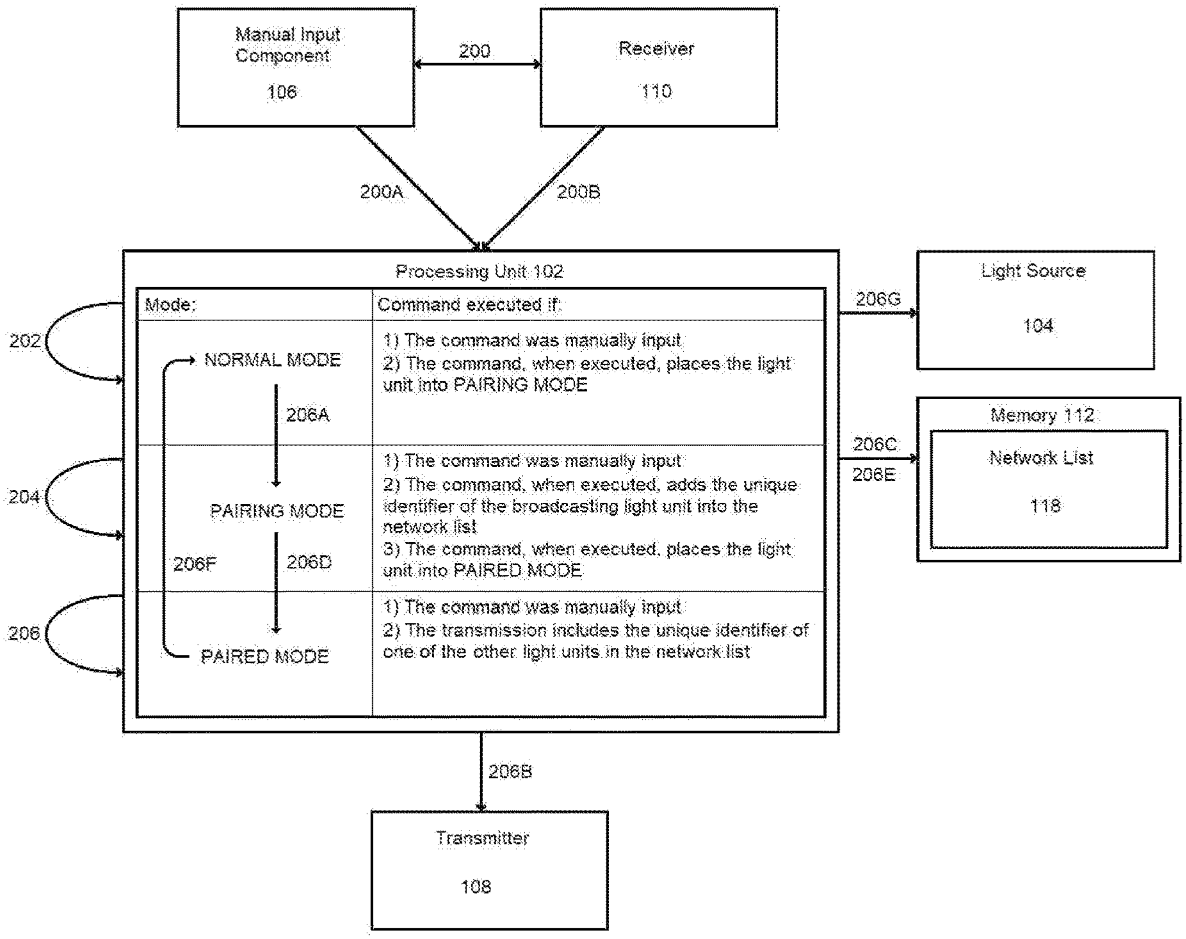
FIG. 2 shows a method of interpreting and/or executing received commands, according to an embodiment.

FIG. 2 shows a method of interpreting and/or executing received commands, according to an embodiment.

The method may begin at step 200, in which a command is received by the light unit.

According to an embodiment, the processing unit 102 receives 200A a manual input from the manual input component 106. According to an embodiment, this data includes how many times a user has toggled the manual input component 106 within a specific time frame.

According to another embodiment, the processing unit 102 receives 200B a transmission from the wireless receiver 108. This transmission includes the unique identifier of the transmitting light unit and a command. Alternatively, this transmission includes one of the reserved commands. Yet alternatively, this transmission includes the unique identifier of one of the other light units in the network list.

At step 202, the processing unit 102 interprets the manual input or the transmission to determine the intent of the manual input or transmission, where intent may be to execute one of the reserved commands or other ordinary commands. According to an embodiment, a manual input is interpreted by the user input processing engine and a transmission is interpreted by the transmission processing engine.

At step 204, the processing unit 102 determines whether or not to execute the received command. According to an embodiment, the processing unit 102 will execute a command if:

- when the light unit is in NORMAL MODE (e.g., a base operating mode) if one of the following conditions is met:
  1) The command was manually input (e.g., by a user toggling the manual input component 106);
  2) The command, when executed, places the light unit into PAIRING MODE (e.g., the command is the START PAIRING command);
- when the light unit is in PAIRING MODE (e.g., a network formation mode) if one of the following conditions is met:
  1) The command was manually input;
  2) The command, when executed, adds the unique identifier of the broadcasting light unit into the network list (e.g., the command is the ADD TO NETWORK COMMAND);
  3) The command, when executed, places the light unit into PAIRED MODE (e.g., the command is the END PAIRING command);
- when the light unit is in PAIRED MODE (e.g., a network mode) if one of the following conditions is met:
  1) The command was manually input;
  2) The transmission containing the transmitted command includes the unique identifier of one of the other light units in the network list.

If none of these conditions are met, the command may be ignored.

According to another embodiment, the processing unit is further configured to not execute the transmitted command if:

- when the light unit is in PAIRED MODE mode:
  - the transmission containing the transmitted command does not include the unique identifier of the light unit.

At step 206, a command is executed, causing the light unit to function according to the executed command.

According to an embodiment, a first reserved command, the START PAIRING command 122, may be executed. When the START PAIRING command is received as a manual input, executing the START PAIRING command causes the light unit to enter 206A PAIRING MODE and to broadcast 206B a START PAIRING command via its transmitter. When the START PAIRING command is received as a transmission, executing the START PAIRING command causes the receiving light unit to enter 206A PAIRING MODE.

According to an embodiment, a second reserved command, the ADD TO NETWORK command 124, may be executed. When the ADD TO NETWORK command is received as a manual input, executing the ADD TO NETWORK command causes the light unit to broadcast 206B an ADD TO NETWORK command via its transmitter. When the ADD TO NETWORK command is received as a transmission, executing the ADD TO NETWORK command causes the receiving light unit to add 206C the unique identifier of the broadcasting light unit into the network list of the receiving light unit.

According to an embodiment, a third reserved command, the END PAIRING command 126, may be executed. When the END PAIRING command is received as a manual input, executing the END PAIRING command causes the light unit to enter 206D PAIRED MODE and to broadcast 206B an END PAIRING command via its transmitter. When the END PAIRING command is received as a transmission, executing the END PAIRING command causes the receiving light unit to enter 206D PAIRED MODE.

According to an embodiment, a fourth reserved command, the RESET command 128, may be executed. When the RESET command is received as a manual input, executing the RESET command causes the light unit to clear 206E its network list (e.g., so that it contains no unique identifiers of other light units), to enter 206F NORMAL MODE, and to broadcast 206A a RESET command via its transmitter. When the RESET command is received as a transmission, executing the RESET command causes the receiving light unit to clear 206E its network list and to enter 206F NORMAL MODE. Alternatively, executing the RESET command does not cause a light unit to clear 206E its network list. Yet alternatively, executing the RESET command does not cause a light unit to enter 206F NORMAL mode.

It should be appreciated that individual light unit functions achieved by executing these reserved commands can be achieved by executing other reserved commands or a combination of other reserved commands. For example, a fifth reserved command, the BREAK PAIRING command 129, may be executed. When the BREAK PAIRING command is received as a manual input, executing the BREAK PAIRING command causes the light unit to clear 206E its network list and to broadcast 206A a BREAK PAIRING command via its transmitter. When the BREAK PAIRING command is received as a transmission, executing the BREAK PAIRING command causes the receiving light unit to clear 206E its network list. As evident, the BREAK PAIRING command achieves the network-list clearing functionality of the RESET command. A sixth reserved command that achieves the NORMAL MODE entering functionality of the RESET command, when combined with the BREAK PAIRING command, will achieve the exact same network-list clearing and NORMAL MODE entering functionality of the RESET command.

It should be appreciated that non-reserved commands (herein ordinary commands) may also be executed by the processing unit 102. According to an embodiment, ordinary commands may include commands to control 206G the light source 104. How ordinary commands are interpreted, as well as what function they perform when executed, may be based on which, if any, other applications 140 are running. For example, with no other applications running, an ordinary command to turn on the light source may control the light source to turn on and to stay on. However, with a game application running, an ordinary command to turn on the light source may control the light source to turn on and to stay on for only 5 seconds.

It should be appreciated that these steps are not limiting and that certain reserved and/or ordinary commands, when executed, can cause the light unit to perform many functions simultaneously or consecutively.

Figure 3:
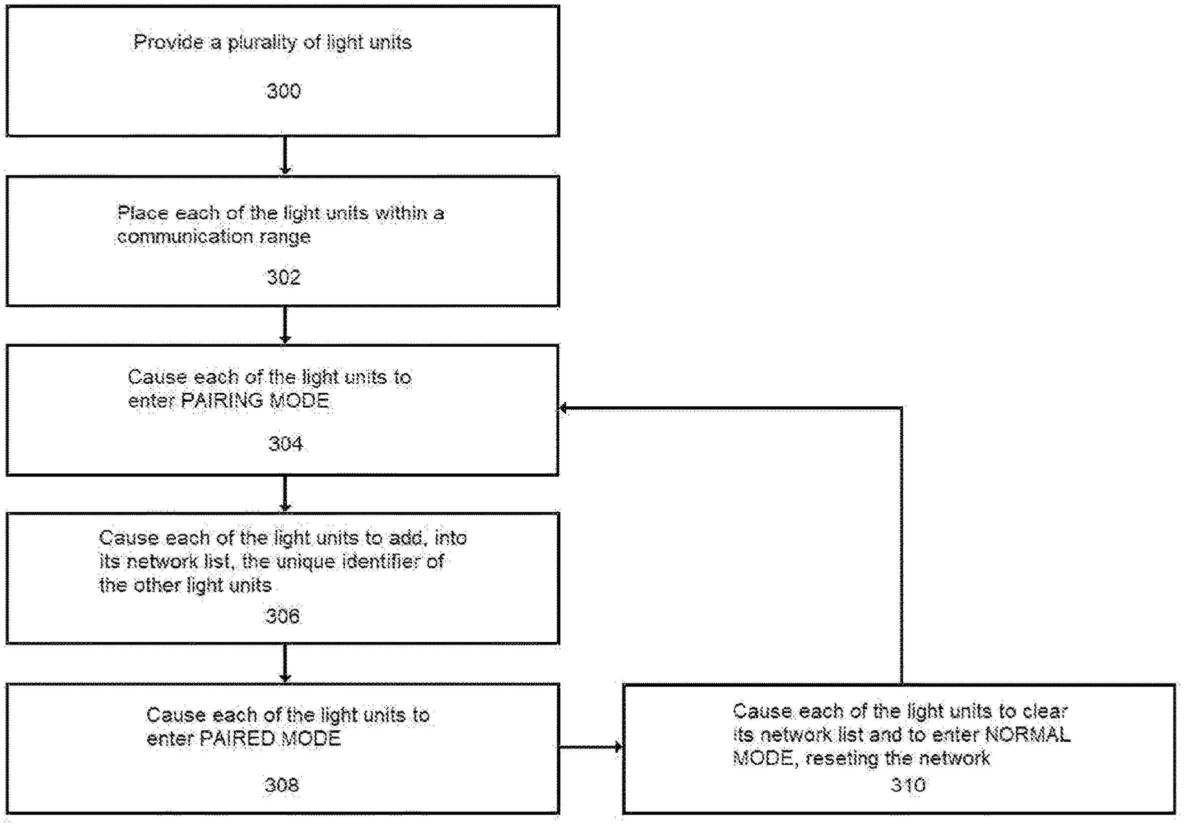
FIG. 3 is a flowchart showing steps of an ad-hoc network deployment method, according to an embodiment.

FIG. 3 is a flowchart showing steps of an ad-hoc network deployment method, according to an embodiment. The method may begin at step 300.

At step 300, a plurality of light units is provided. According to an embodiment, the light units are those depicted in FIG. 1.

At step 302, each of the light units is placed within a communication range such that each of the light units is in a state and/or placement that enables it to communicate with every other light unit in the plurality of light units. For example, in an embodiment where a plurality of light units is configured to communicate through wired communication media, placing each of the light units within a communication range may involve connecting each of the light together via ethernet cable. In an embodiment where a plurality of light units is configured to communicate through wireless communication media, placing each of the light units within a communication range may involve placing each of the light units sufficiently close to each other such that there are no barriers that block light unit transmissions. According to an embodiment, the placement of each light unit enables it to receive broadcasts from every other light unit.

At step 304, each of the light units is caused to enter PAIRING MODE. According to an embodiment, this action is caused when a first user interaction with one of the light units causes that light unit to 1) enter PAIRING MODE and 2) broadcast a transmission containing a first reserved command that, when executed by other light units, causes the other light units to enter PAIRING MODE. The first reserved command may be the START PAIRING command or any other reserved command, or combination thereof, with equivalent functionality. The first user interaction may be a user toggling the manual input component a first number of times within a time frame (e.g. When a user toggles the manual input component once, the processing unit executes the START PAIRING command).

At step 306, each of the light units is caused to add, into its network list, the unique identifier of other light units. According to an embodiment, this action is caused when a second user interaction with each of the light units causes that light unit to broadcast a transmission containing a second reserved command that, when executed by the other light units, causes the other light units to add the unique identifier of the broadcasting light unit into the network list of the other light units. The second reserved command may be the ADD TO NETWORK command or any other reserved command, or combination thereof, with equivalent functionality. The second user interaction may be a user toggling the manual input component a second number of times within a time frame (e.g. When a user toggles the manual input component twice, the processing unit executes the ADD TO NETWORK command). Second user interactions may occur sequentially (e.g., a user toggles the manual input component of a first light unit, then toggles the manual input component of a second light unit, then toggles the manual input component of a third light unit, and so on, until each of the light units has executed the ADD TO NETWORK command, and, thus, each of the light units is caused to add, into its network list, the unique identifier of other light units). Alternatively, second user interactions may occur simultaneously (e.g., a user toggles the manual input component of all the light units at the same time. Alternatively, second user interactions may occur in sets (e.g., a user toggles the manual input components of a first set of light units, then toggles the manual input components of a second set of light units, and so on).

At step 308, each of the light units is caused to enter PAIRED MODE. According to an embodiment, this action is caused when a third user interaction with one of the light units causes that light unit to 1) enter PAIRED MODE and 2) broadcast a transmission containing a third reserved command that, when executed by other light units, causes the other light units to enter PAIRED MODE. The third reserved command may be the END PAIRING command or any other reserved command, or combination thereof, with equivalent functionality. The third user interaction may be a user toggling the manual input component a third number of times (e.g., When a user toggles the manual input component thrice, the processing unit executes the END PAIRING command).

The method may proceed to step 310, an optional step to reset the network.

At step 310, each of the light units is caused to clear its network list and to enter NORMAL MODE. According to an embodiment, this action is caused when a fourth user interaction with one of the light units causes that light unit to 1) clear its network list, 2) enter NORMAL MODE, and 3) broadcast a transmission containing a fourth reserved command that, when executed by other light units, causes the other light units to clear their network lists and to enter NORMAL MODE. The fourth reserved command may be the RESET command or any other reserved command, or combination thereof, with equivalent functionality. The fourth user interaction may be a user toggling the manual input component a fourth number of times (e.g. When a user toggles the manual input component four times, the processing unit executes the RESET command).

FIGS. 4*a*-4*d* show the ad-hoc network deployment method of FIG. 3, as applied to a group of four light units, according to an embodiment. Each light unit is in NORMAL MODE and its network list is empty. It should be appreciated that varying starting conditions may require a different sequence of steps to deploy an ad-hoc network. For illustrative purposes, each light unit is labeled with its unique identifier, as well as its instant operating mode and network list of other light units.

Stage 1 shows step 300, in which a plurality of light units is provided. Here, each of the light units is similar to the light unit depicted in FIG. 1.

Stage 2 shows step 302, in which each of the light units is placed within a communication range. Here, a first light unit 400, a second light unit 402, a third light unit 404, and a fourth light unit 406 are placed on distal corners of a table 408.

Stage 3 shows step 304, in which each of the light units is caused to enter PAIRING MODE. Here, a user pushes a button on the first light unit one time (In this example a button is the manual input component for each light unit). The processing unit of the first light unit interprets this manual input as a manually inputted START PAIRING command. The first light unit is in NORMAL MODE so the START PAIRING command is executed, causing the first light unit to enter PAIRING MODE and to broadcast a START PAIRING command. The broadcast is received by the second, third, and fourth light units. The processing units of the second, third, and fourth light units interpret this broadcast as a transmitted START PAIRING command. The second, third, and fourth light units are in NORMAL MODE so the START PAIRING command is executed, causing the second, third, and fourth light units to enter PAIRING MODE.

Stages 4-7 show step 306, in which each of the light units is caused to add, into its network list, the unique identifier of other light units.

In stage 4, a user pushes a button on the first light unit two times. The processing unit of the first light unit interprets this manual input as a manually inputted ADD TO NETWORK command. The first light unit is in PAIRING MODE so the ADD TO NETWORK command is executed, causing the first light unit to broadcast an ADD TO NETWORK command. The broadcast is received by the second, third, and fourth light units. The processing units of the second, third, and fourth light units interpret this broadcast as a transmitted ADD TO NETWORK command. The second, third, and fourth light units are in PAIRING MODE so the ADD TO NETWORK command is executed, causing the second, third, and fourth light units to add, into their network lists, the unique identifier of the first light unit.

In stage 5, a user pushes a button on the second light unit two times. The processing unit of the second light unit interprets this manual input as a manually inputted ADD TO NETWORK command. The second light unit is in PAIRING MODE so the ADD TO NETWORK command is executed, causing the second light unit to broadcast an ADD TO NETWORK command. The broadcast is received by the first, third, and fourth light units. The processing units of the first, third, and fourth light units interpret this broadcast as a transmitted ADD TO NETWORK command. The first, third, and fourth light units are in PAIRING MODE so the ADD TO NETWORK command is executed, causing the first, third, and fourth light units to add, into their network lists, the unique identifier of the second light unit.

In stage 6, a user pushes a button on the third light unit two times. The processing unit of the third light unit interprets this manual input as a manually inputted ADD TO NETWORK command. The third light unit is in PAIRING MODE so the ADD TO NETWORK command is executed, causing the third light unit to broadcast an ADD TO NETWORK command. The broadcast is received by the first, second, and fourth light units. The processing units of the first, second, and fourth light units interpret this broadcast as a transmitted ADD TO NETWORK command. The first, second, and fourth light units are in PAIRING MODE so the ADD TO NETWORK command is executed, causing the first, second, and fourth light units to add, into their network lists, the unique identifier of the first light unit.

In stage 7, a user pushes a button on the fourth light unit two times. The processing unit of the fourth light unit interprets this manual input as a manually inputted ADD TO NETWORK command. The fourth light unit is in PAIRING MODE so the ADD TO NETWORK command is executed, causing the fourth light unit to broadcast an ADD TO NETWORK command. The broadcast is received by the first, second, and third light units. The processing units of the first, second, and third light units interpret this broadcast as a transmitted ADD TO NETWORK command. The first, second, and third light units are in PAIRING MODE so the ADD TO NETWORK command is executed, causing the first, second, and third light units to add, into their network lists, the unique identifier of the first light unit.

Stage 8 shows step 308, in which each of the light units is caused to enter PAIRED MODE. Here, a user pushes a button on the first light unit three times. The processing unit of the first light unit interprets this manual input as a manually inputted END PAIRING command. The first light unit is in PAIRING MODE so the END PAIRING command is executed, causing the first light unit to enter PAIRED MODE and to broadcast an END command. The broadcast is received by the second, third, and fourth light units. The processing units of the second, third, and fourth light units interpret this broadcast as a transmitted END PAIRING command. The second, third, and fourth light units are in PAIRING MODE so the END PAIRING command is executed, causing the second, third, and fourth light units to enter PAIRED MODE.

This ad-hoc lighting network embodies a significant advance over existing lighting networks that lack the ease-of-deployment and flexibility of the instant invention.

To begin network deployment, a user simply places a plurality of light units within a communication range. Next, he or she manually inputs an ENTER PAIRING command into any one of the light units by toggling its manual input component, causing all light units to enter PAIRING MODE. Next, he or she manually inputs an ADD TO NETWORK command into each of the light units by toggling their manual input components, causing all light units to be paired with each other. Finally, he or she manually inputs an END PAIRING command into any one of the light units by toggling its manual input component, causing all light units to enter PAIRED MODE.

Once every light unit is in PAIRED MODE, the ad-hoc lighting network is fully deployed and ready to use. Deployment time scales linearly with the number of light units. For several light units, the network can be deployed in under a minute.

According to an embodiment, a light unit may only enter the network by broadcasting an ADD TO NETWORK command while every light unit is in PAIRING MODE during the network deployment processes. Additional light units cannot be introduced into the network once the original plurality of light units is in PAIRED MODE. Thus, light units outside of the network cannot join the network once the network is deployed. Furthermore, a light unit in PAIRED MODE does not execute a transmitted command if the transmission does not include the unique identifier of another light unit in the network list. Thus, light units outside of the network cannot be used to control light units within the network. As a result, multiple lighting networks may function alongside each other without interference from each other.

Within this network, each of the light units is configured to function identically with respect to reserved commands received via the manual input component of the light unit, to function identically with respect to reserved commands received via the receiver of the light unit, and to act as a controller for all light units in the lighting network. In contrast to existing lighting networks that require a user to interact with a designated master controller, the lighting network of the present invention can be controlled using any one of the light units. There is no need for a master controller as a user can simply interact with the nearest light unit. Any one of the light units can receive user commands, causing all light units in the network, or a subset thereof, to execute the command. Such commands may direct light units to form the desired lighting configuration.

Figure 5:
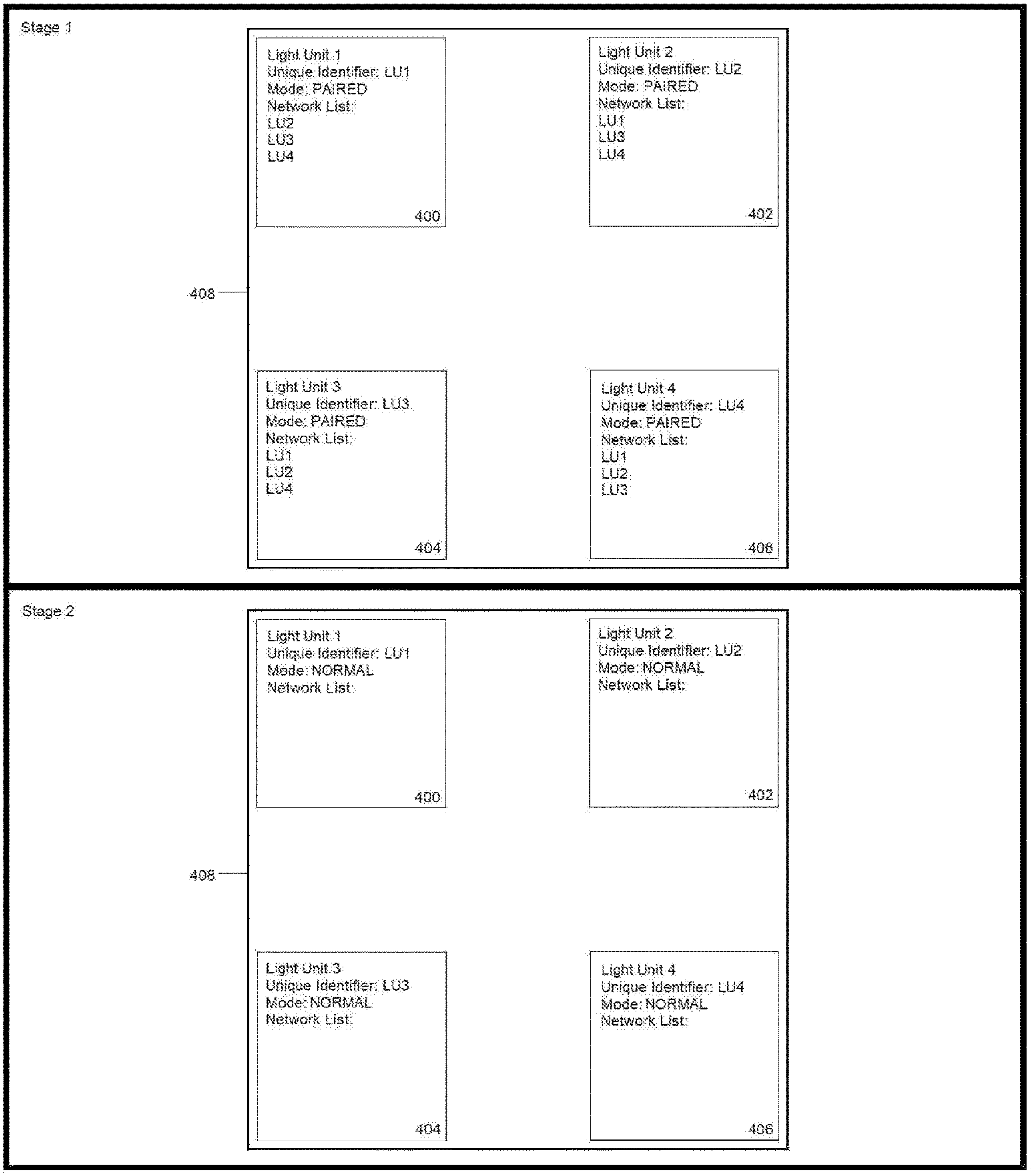
FIG. 5 shows an optional reset step for an ad-hoc network, according to an embodiment.

FIG. 5 shows an optional reset step for an ad-hoc network, as applied to a group of four light units, according to an embodiment. Each light unit is in PAIRED MODE and its network list contains the unique identifiers of other light units. It should be appreciated that varying starting conditions may require a different sequence of steps to reset the ad-hoc network. For illustrative purposes, each light unit is labeled with its unique identifier, as well as its instant operating mode and network list of other light units.

Figure 4A:
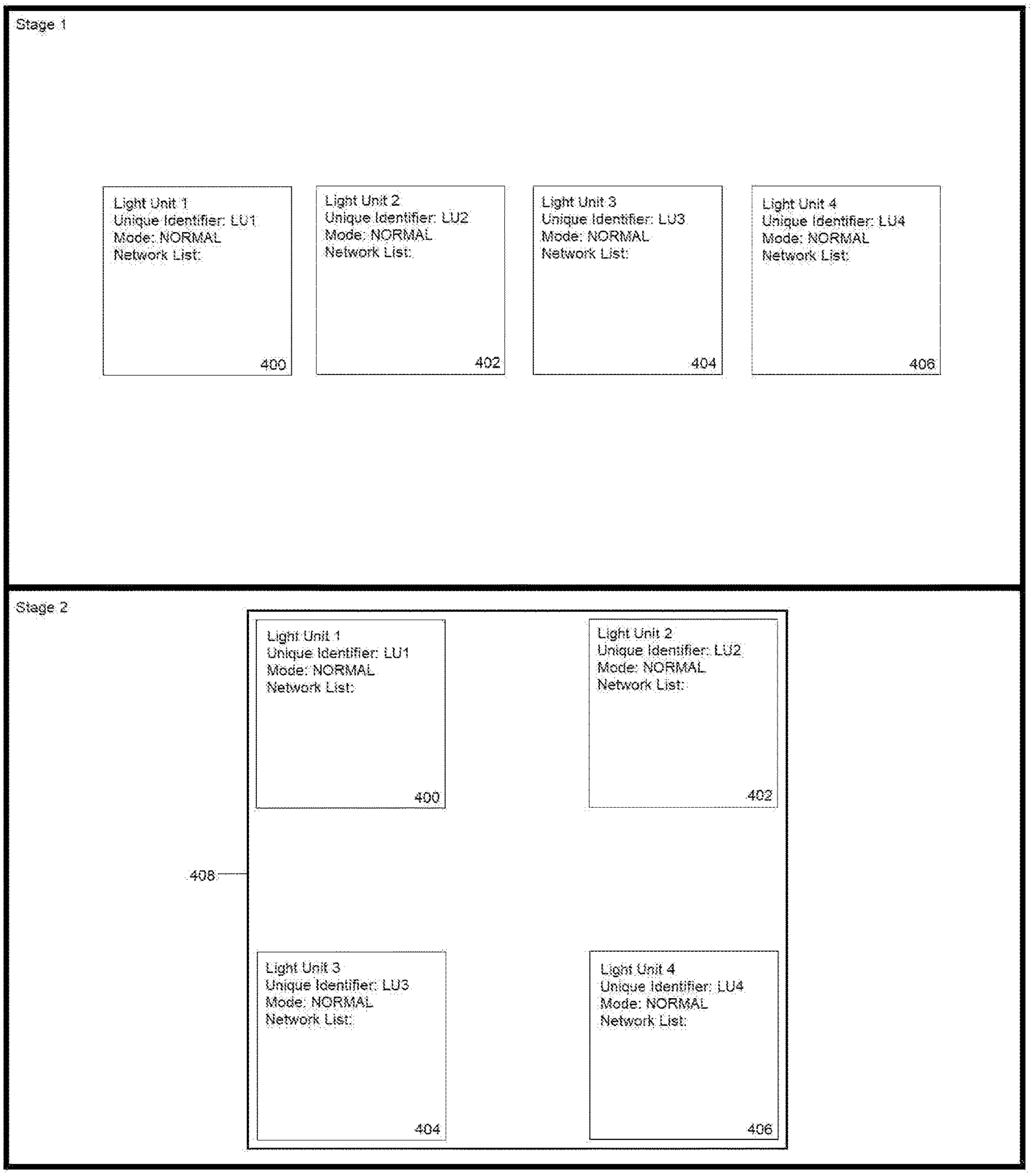
FIGS. 4*a*-4*d* show the ad-hoc network deployment method of FIG. 3, as applied to a group of four light units, according to an embodiment.
Figure 4B:
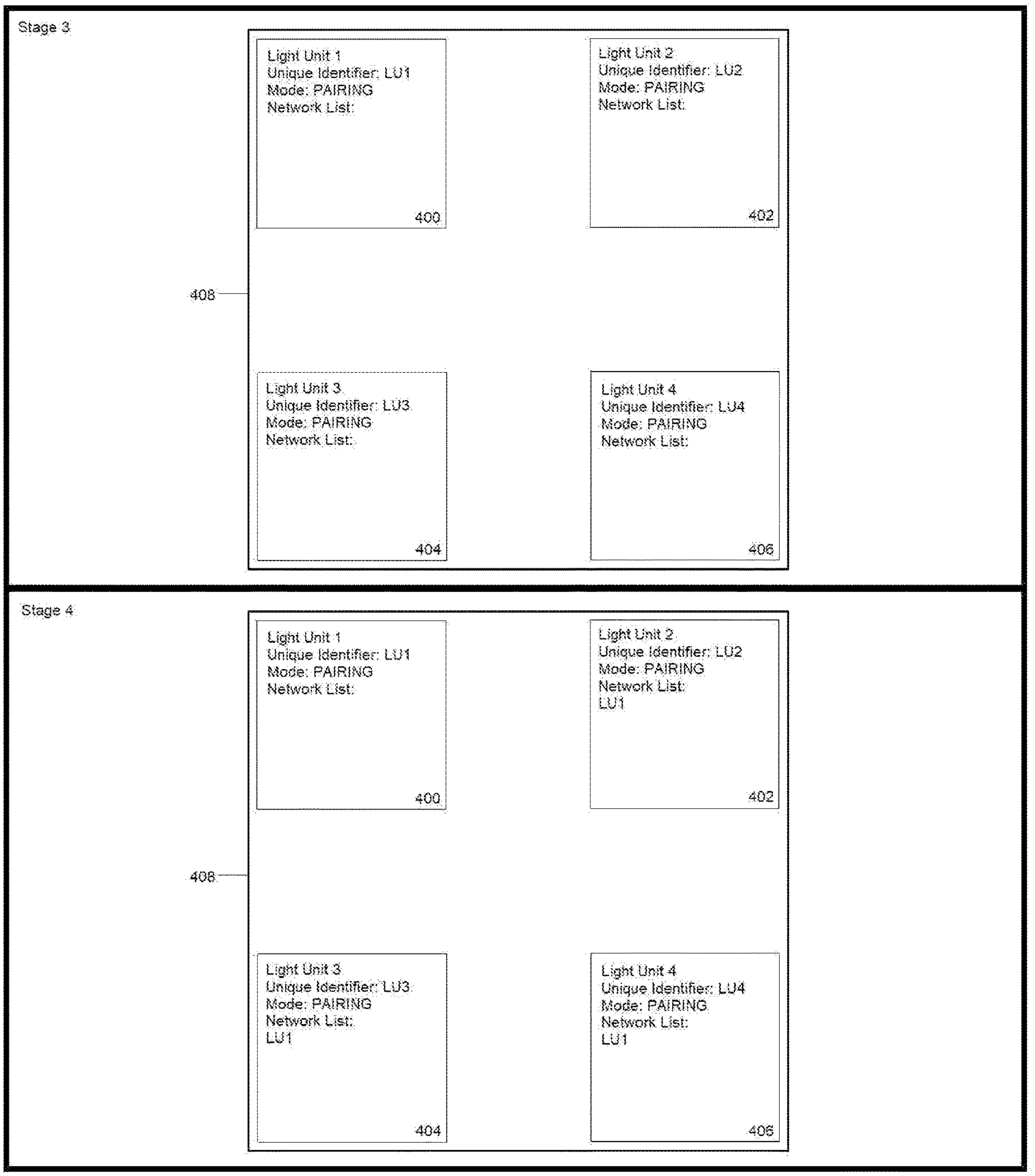
Figure 4C:
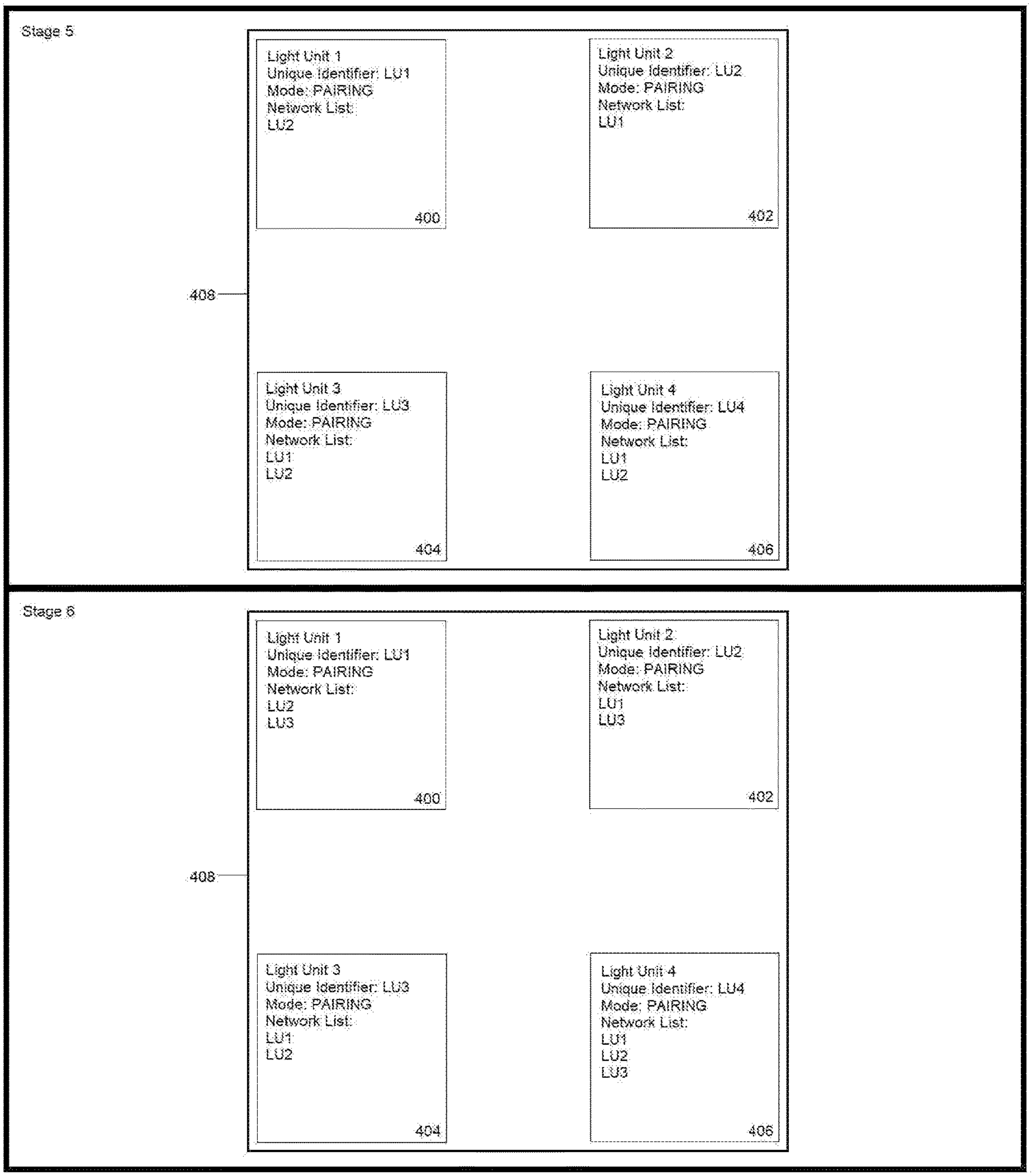
Figure 4D:
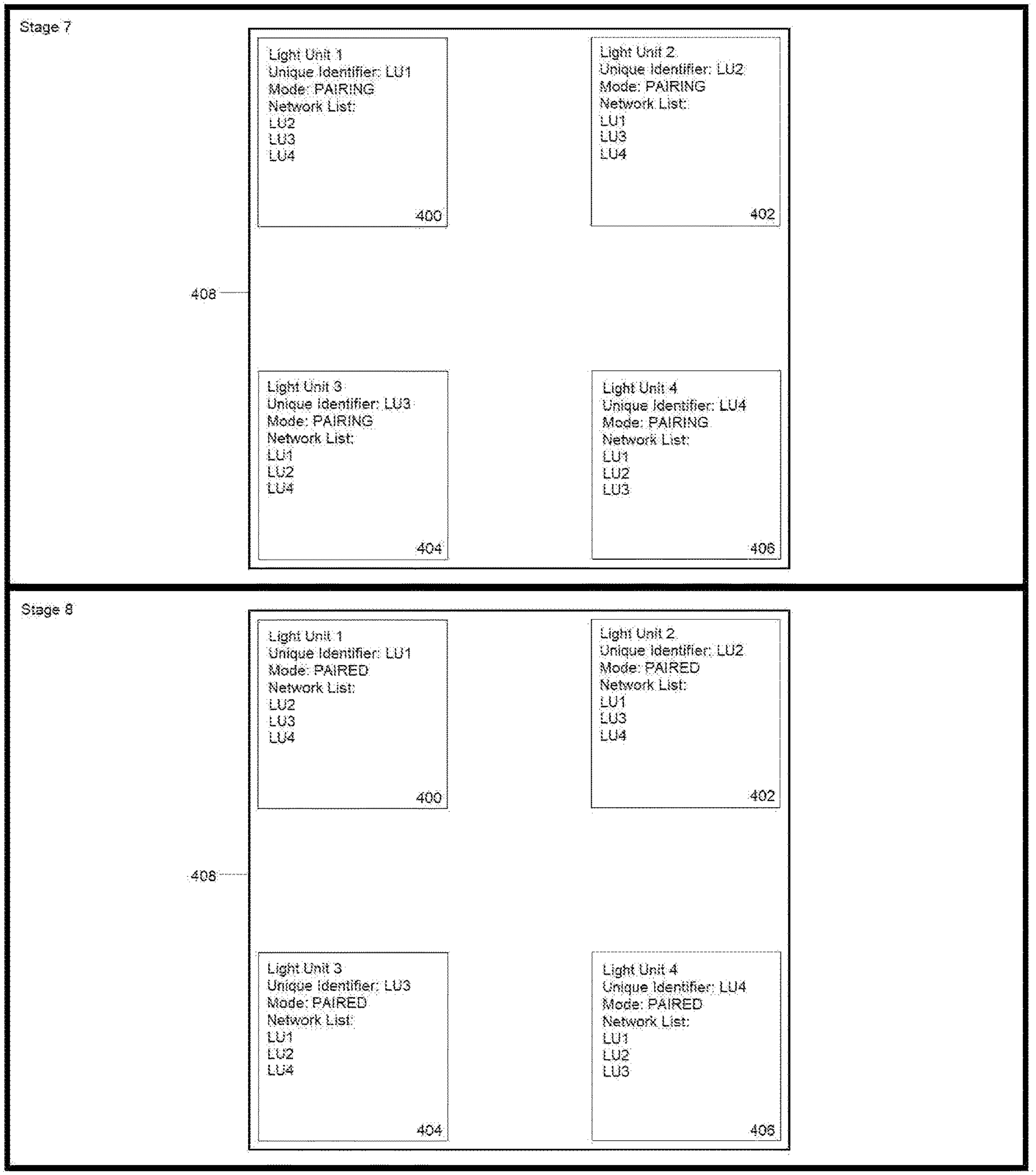

Stage 1 shows stage 8 of FIG. 4*d*.

Stage 2 shows step 310, in which each of the light units is caused to clear its network list and to enter NORMAL MODE. Here, a user pushes a button on the first light unit four times. The processing unit of the first light unit interprets this manual input as a manually inputted RESET command. The first light unit is in PAIRED MODE so the RESET command is executed, causing the first light unit to clear its network list, to enter NORMAL MODE and to broadcast a RESET command. The broadcast is received by the second, third, and fourth light units. The processing units of the second, third, and fourth light units interpret this broadcast as a transmitted RESET command. The second, third, and fourth light units are in PAIRED MODE so the RESET command is executed, causing the second, third, and fourth light units to clear their network lists and to enter NORMAL MODE.

Methods in this document are illustrated as blocks in a logical flow graph, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described method blocks can be combined in any order to implement the illustrated method, or alternate methods. Additionally, individual blocks may be deleted from the methods without departing from the spirit and scope of the subject matter described herein.

We claim:

1. A light unit for use as a node in an ad-hoc lighting network, the light unit comprising:
- a light source;
- a manual input component;
- a processing unit;
- memory including:
  - a unique identifier;
  - reserved commands;
  - a network list of unique identifiers;
- wherein, when the lighting network is deployed using a plurality of light units, each of the plurality of light units is configured to:
  - function identically with respect to the reserved commands received via the manual input component of the light unit;
  - function identically with respect to the reserved commands received not via the manual input component of the light unit;
  - without special designation, act as a controller for the lighting network;
- wherein which of the reserved commands is received via the manual input component is determined based on how the manual input component is toggled, the manual input component able to be toggled in at least a first manner, a second manner, and a third manner;
- wherein toggling the manual input component in the first manner causes the light unit to:
  - when the light unit is in a first mode:
    - broadcast a first reserved command that, when executed by an other light unit in the first mode, causes the other light unit in the first mode to enter the second mode;
- wherein toggling the manual input component in the second manner causes the light unit to:
  - when the light unit is in the second mode:
    - broadcast a second reserved command that, when executed by the other light unit in the first mode, causes the other light unit in the first mode to add, into its network list, the unique identifier of the broadcasting light unit;
- wherein toggling the manual input component in the third manner causes the light unit to:
  - when the light unit is in the first mode:
    - broadcast a third reserved command that, when executed by an other light unit in the second mode, causes the other light unit in the second mode to add, into its network list, the unique identifiers in the network list of the broadcasting light unit;
    - enter a third mode; and
    - broadcast a third reserved command that, when executed by the other light unit in the second mode, causes the other light unit in the second mode to enter the third mode.

2. An ad-hoc lighting network having a plurality of light units according to claim 1, wherein
- for the ad-hoc lighting network having a plurality of light units:
  - all but one of light units in the plurality of light units are caused to enter the second mode when a user toggles, in the first manner, the manual input component of the light unit in the first mode;
  - one of the light units in the first mode is caused to add, into its network list, the unique identifier of the other light unit in the second mode when the user toggles, in a second manner, the manual input component of the other light unit in the second mode;
  - all light units in the plurality of light units are caused to enter the third mode when the user toggles, in the third manner, the manual input component of the light unit in the first mode.

3. A method of deploying an ad-hoc lighting network, the method comprising:
- providing a plurality of light units, each of the light units including:
  - a light source;
  - a manual input component;
  - a transmitter;
  - a receiver;
  - memory including:

a unique identifier;
reserved commands;
a network list of unique identifiers;
placing each of the light units within a communication range;
causing each of the light units to add, into its network list, the unique identifiers of the plurality of light units;
causing each of the light units to enter a third mode;
wherein, when a given light unit is in the third mode:
a transmission containing the transmitted command is executed by the given light unit if the transmission includes the unique identifier of the given light unit;
wherein toggling the manual input component in a first manner causes the light unit to:
when the light unit is in a first mode:
broadcast a first reserved command that, when executed by an other light unit in the first mode, causes the other light unit in the first mode to enter a second mode;
wherein toggling the manual input component in a second manner causes the light unit to:
when the light unit is in the second mode:
broadcast a second reserved command that, when executed by the other light unit in the first mode, causes the other light unit in the first mode to add, into its network list, the unique identifier of the broadcasting light unit;
wherein toggling the manual input component in a third manner causes the light unit to:
when the light unit is in the first mode:
broadcast a third reserved command that, when executed by an other light unit in the second mode, causes the other light unit in the second mode to add, into its network list, the unique identifiers in the network list of the light unit in the first mode;
enter a third mode;
broadcast a third reserved command that, when executed by the other light unit in the second mode, causes the other light unit in the second mode to enter the third mode.

4. The method of claim 3, wherein
each of the light units is configured to:
function identically with respect to the reserved commands received via the manual input component of the light unit;
function identically with respect to the reserved commands received not via the manual input component of the light unit;
without special designation, act as a controller for the lighting network; and
which of the reserved commands is received via the manual input component is determined based on how the manual input component is toggled, the manual input component able to be toggled in at least the first manner, the second manner, and the third manner.

5. The method of claim 4,
further comprising the step of:
causing all but one of the light units in the first mode to enter the second mode.

6. The method of claim 5, wherein
the all but one of the light units in the first mode is caused to enter the second mode when a user toggles the manual input component of the light unit in the first mode in the first manner; and
each of the light units is caused to add, into its network list, the unique identifiers of each light unit in the network when the user toggles the manual input component of the light unit in the first mode in the third manner.

7. An ad-hoc lighting network comprising:
a plurality of light units, each of the light units including:
a light source;
a manual input component;
a processing unit;
memory including:
a unique identifier;
reserved commands;
a network list of unique identifiers;
wherein, when the lighting network is deployed using the plurality of light units, each of the light units is configured to:
function identically with respect to the reserved commands received via the manual input component of the light unit;
function identically with respect to the reserved commands received not via the manual input component of the light unit;
without special designation, act as a controller for the lighting network; and
wherein which of the reserved commands is received via the manual input component is determined based on how the manual input component is toggled, the manual input component able to be toggled in at least a first manner, a second manner, and a third manner;
wherein
for each of the light units in the plurality of light units:
toggling the manual input component in the first manner causes the light unit to:
when the light unit is in a first mode:
broadcast a first reserved command that, when executed by an other light unit in the first mode, causes the other light unit in the first mode to enter the second mode;
toggling the manual input component in the second manner causes the light unit to:
when the light unit is in the second mode:
broadcast a second reserved command that, when executed by the other light unit in the first mode, causes the other light unit in the first mode to add, into its network list, the unique identifier of the broadcasting light unit;
toggling the manual input component in a third manner causes the light unit to:
when the light unit is in the first mode:
broadcast a third reserved command that, when executed by an other light unit in the second mode, causes the other light unit in the second mode to add, into its network list, the unique identifiers in the network list of the broadcasting light unit;
enter a third mode;
broadcast a third reserved command that, when executed by the other light unit in the second mode, causes the other light unit in the second mode to enter the third mode.

8. The lighting network of claim 7, wherein
all but one of light units in the plurality of light units are caused to enter the second mode when a user toggles, in the first manner, the manual input component of the light unit in the first mode;
one of the light units in the first mode is caused to add, into its network list, the unique identifier of the other light unit in the second mode when a user toggles, in a second manner, the manual input component of the other light unit in the second mode;

all light units in the plurality of the light units is caused to enter the third mode when the user toggles, in the third manner, the manual input component of the light unit in the first mode.

* * * * *